United States Patent [19]

Haddad et al.

[11] Patent Number: 4,968,012

[45] Date of Patent: Nov. 6, 1990

[54] MODULAR WORKPIECE HOLDING APPARATUS

[75] Inventors: Eugene R. Haddad, Troy; Robert R. Bienkowski, Rochester, both of Mich.

[73] Assignee: Time Engineering, Inc., Troy, Mich.

[21] Appl. No.: 350,465

[22] Filed: May 10, 1989

[51] Int. Cl.$^5$ ............................................... B25B 1/00
[52] U.S. Cl. .......................................... 269/88; 269/9; 269/95; 269/900
[58] Field of Search ...................... 269/9, 95, 100, 101, 269/88, 282, 900

[56] References Cited

U.S. PATENT DOCUMENTS

| | | | |
|---|---|---|---|
| 3,846,917 | 11/1974 | Blakey | 33/180 |
| 3,967,816 | 7/1976 | Ramspersev et al. | 269/9 |
| 4,298,195 | 11/1981 | McDougal | 269/900 |
| 4,445,678 | 5/1984 | Geovse | 269/88 |
| 4,463,937 | 9/1984 | Celette | 269/17 |
| 4,489,500 | 12/1984 | Vaiat | 33/394 |
| 4,630,811 | 12/1986 | Rudisill | 269/118 |
| 4,711,437 | 12/1987 | Longenecker et al. | 269/91 |
| 4,731,936 | 3/1988 | Aldrich et al. | 33/608 |
| 4,805,887 | 2/1989 | Ray | 269/21 |

OTHER PUBLICATIONS

Enerpack Production Automation E-207 Catalog.
GM Truck & Bus Group Universal Gaging System Booklet.

Primary Examiner—J. J. Hartman
Attorney, Agent, or Firm—Basile and Hanlon

[57] ABSTRACT

A modular workpiece holding apparatus for locating and holding a workpiece in a predetermined position. The apparatus includes a base having a plurality of external faces, each with a plurality of bores arranged in an X-Y grid pattern of parallel rows, the bores alternating vertically and horizontally between first and second different diameter bores. A riser is mounted at a predetermined position on the base by bushings and fasteners extending between the riser and the bores in the base. The bushings in each riser are arranged in diagonally opposed pairs such that one pair of bushings engages the first diameter bores in the base; while the second opposed pair of bushings engages the second enlarged diameter bores in the base. A workpiece attachment member is mounted on the mounting head end of each riser to locate and hold a workpiece. The mounting head of each riser is axially in line with the riser mounting base or offset from the riser mounting base. Each bushing includes an internal bore having a threaded end portion and an enlarged, coaxial, smooth portion. Each fastener includes a plurality of threads adjacent one end and an unthreaded portion extending from the threaded end so as to be movably retainable within a bushing in the riser mounting base after the threaded end portion of the fastener is threaded through the threaded end of the bore in the riser mounting base.

23 Claims, 5 Drawing Sheets

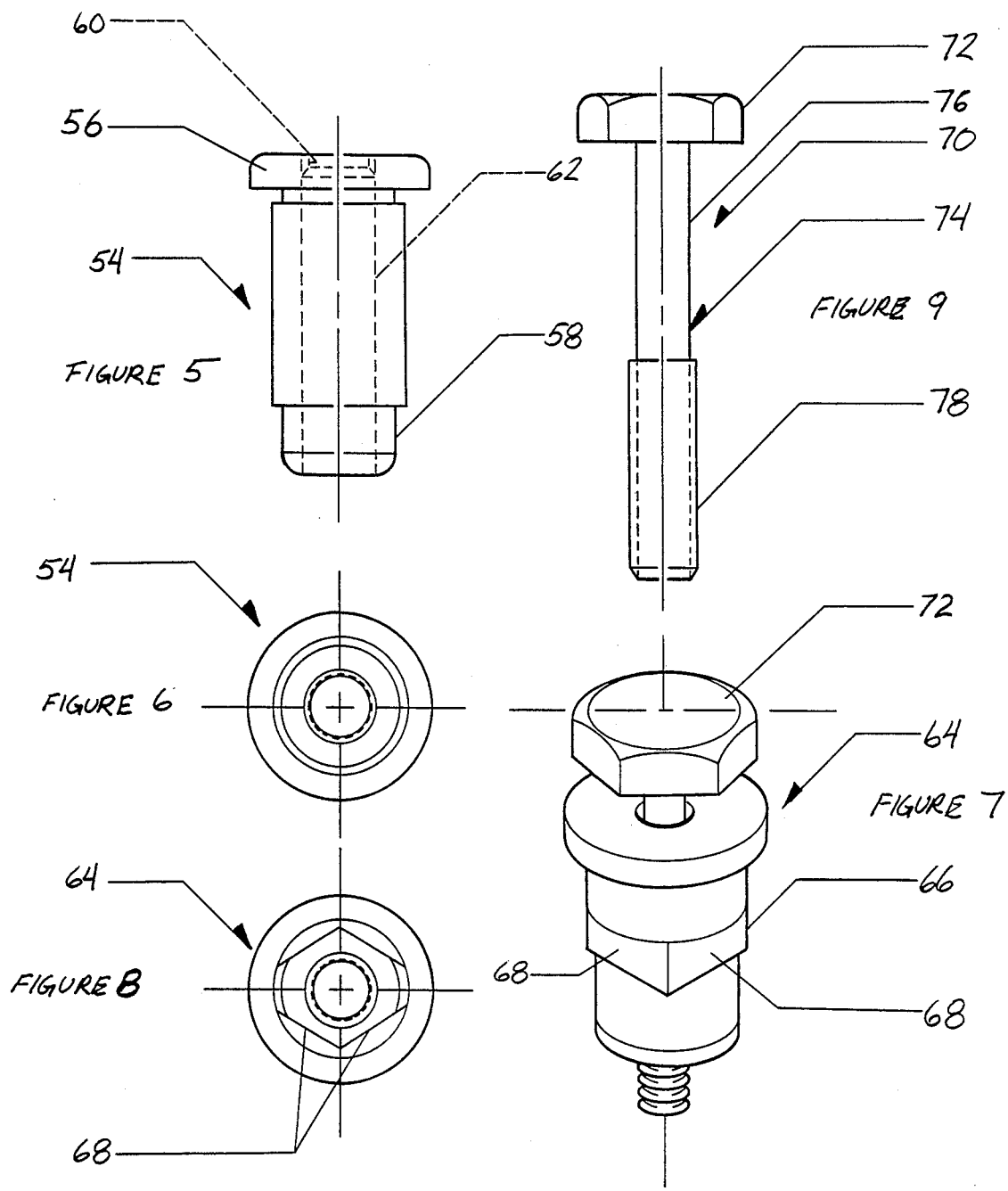

MODULAR WORKPIECE HOLDING APPARATUS

BACKGROUND OF THE INVENTION

Field of the Invention

The present invention relates, in general, to fixtures and apparatus for holding workpieces during manufacturing operations and, more specifically, to fixtures and apparatus for holding workpieces during inspection, dimension checking or gaging operations.

In manufacturing operations, workpieces or parts are manufactured to prescribed dimensions and shape. For quality control purposes, manufactured parts are checked on a scheduled basis against a standard or master part or set of dimensions.

During such checking operations, the workpiece is mounted in a workpiece holder and its dimensions checked by hand using gages, etc., to determine its correlation to the desired dimensions or master part. Coordinate measuring machines (CMM) are also employed to electronically measure the dimensions of a part held in a holder and to compare such dimensions with an established standard.

In such checking or gaging operations, the workpiece holder is typically a dedicated fixture constructed for one particular part, workpiece or assembly. The holder is constructed of a frame mountable on a grid plate to establish known reference coordinates. Various clamps, locators, etc., are then mounted on the frame and hold the workpiece or part in a known location with respect to the reference coordinates while checking is performed via hand-held gages or a coordinate measuring machine.

The dedication of one fixture for each specific part is extremely costly since the entire fixture is typically discarded when the part is extensively changed or becomes obsolete. Further, the storage of such fixtures is a problem due to the large number of fixtures required in certain manufacturing operations. In an automobile assembly and/or stamping plant, the large number of different vehicles necessitates a correspondingly high number of fixtures, each requiring storage space when not in use.

The large number of dedicated fixtures also leads to lengthy setup times. Each fixture must be first removed from the checking station and returned to storage before the next fixture to be used is brought from storage and accurately located on the grid plate before checking can commence.

To overcome these problems, several attempts have been made to develop modular workpiece holder assemblies in which workpiece holders, such as clamps, locators, etc., are attached to a common base having an X-Y grid arrangement of mounting bores. The X-Y grid arrangement of mounting bores enables the workpiece holder elements to be mounted in any desired position on the base to hold any one of a different number of parts or workpieces for checking, with only the holder elements being specifically designed for each different workpiece.

However, lengthy setup time remains a problem with such modular workpiece holding fixtures as the location of the base and the attached clamps, locators, etc., must be precisely determined each time a different workpiece is to be checked. The dimensional accuracy of the locators or clamps attached to the base must also be ascertained during each setup.

Thus, it would be desirable to provide a workpiece holder which decreases the setup time required in positioning a checking fixture to check the dimensions of a manufactured part or workpiece. It would also be desirable to provide a workpiece holder which minimizes storage requirements of such holders in a manufacturing facility. It would also be desirable to provide a workpiece holder for checking the dimensions of a workpiece which includes reusable components to minimize cost, even when the part being checked changes or becomes obsolete. Finally, it would also be desirable to provide a workpiece holder which reproducably accurately locates a workpiece or part for a checking or gaging operation.

SUMMARY OF THE INVENTION

The present invention is a modular workpiece holding apparatus for holding and locating a workpiece in a predetermined location for dimension checking or machining operations.

The apparatus includes a base having a plurality of exterior faces. A plurality of bores are formed in each face of the base in parallel rows forming an X-Y grid pattern, with the bores alternating vertically and horizontally between a first diameter bore and a second different diameter bore. Each bore has a threaded end portion.

The apparatus also includes a plurality of risers, each having a riser mounting base, a support of a predetermined length and configuration which is connected at one end to the riser mounting base, and a mounting head connected to a second end of the support. Workpiece engaging means are connected to each riser mounting head and engage a workpiece to locate and hold the workpiece.

A plurality of bores are formed in and extend through each riser mounting base. A bushing is fixedly mounted in each bore in the riser mounting base and extends outward from the riser mounting base. Fastening means extend through each bushing in the riser mounting base and engages the threaded end portion of one of the bores in the base to secure the riser to the base. The bores in the riser mounting base are spacedly arranged to align with the bores in one face of the base, with one diagonal pair of bushings in a riser mounting base engaging precision first diameter bores in the base and the other diagonal pair of bushings in the riser mounting base engaging second different diameter bores in the base.

In a preferred embodiment, the base is formed as a single piece, cast cube having four vertically extending faces and spaced, horizontally extending, top and bottom faces. The bushings fixed in the riser mounting base provide positioning of each riser on the base. In a preferred embodiment, two of the bushings in each riser mounting base have a circular exterior surface; while the opposed pair of bushings in each riser have a diamond shaped exterior for precise locating of the riser on the base regardless of the position or orientation of the riser with respect to the base. The riser may be rotated about a vertically extending axis through the center of the riser mounting base to any position. In each position, a diagonally opposed pair of bushings in the riser mounting base, each formed of a circular shaped bushing and a diamond shaped bushing, will engage the precision first diameter bores in the base to precisely locate and position each riser on the base.

Fasteners are then extended through the bushings into the threaded end portions in the bores in the base to securely attach each riser to the base. In a preferred embodiment, the fasteners are self contained within the bushings in each riser for ease in installing each riser on the base. In this embodiment, each bushing is provided with a longitudinal bore having a smaller diameter threaded end portion and a larger diameter, unthreaded, smooth portion. Each fastener is in the form of a screw having a head and an axial shaft. The shaft is threaded from one end opposite the head a short distance along the length of the axial shaft, with the remaining portion of the shaft being unthreaded. A fastener may thus be threaded through the threaded end portion of the bore in each bushing until the unthreaded portion of each fastener slides through the bushing thereby allowing each fastener to be axially movable within each bushing and yet be contained and movable with each riser. When the bushings have been inserted into the bores in the base, the fasteners may then be tightened into the threaded end portions in the bores in the base to securely mount each riser on the base.

In another embodiment of the present invention, the support attached to each riser mounting base is fabricated in a number of different configurations and lengths to provide versatility in precisely locating and holding a part on the base. In one type of the riser, the support has a generally planar configuration and extends axially from the riser mounting base such that the mounting head at the end of the support is positioned substantially axially in line with the riser mounting base. The length of the support may be selected as necessary to position the mounting head at any desired position with respect to the riser mounting base.

In another embodiment, the support has a generally angular configuration such that the mounting head is offset a predetermined distance from a vertical axis extending through the riser mounting base. Again, the amount of offset may be selected as desired for a particular application.

The modular workpiece holding apparatus of the present invention provides several significant advantages over currently available workpiece holders used in checking and machining operations. The modular base with the X-Y grid of bores allows risers and workpiece attachment means to be mounted at any desired location thereon to hold and locate a particular part. In this manner, a single base may be utilized with a large number of different riser and workpiece attachment means thereby minimizing the cost of the checking equipment. The base may also be usable even with changes to the parts or obsolescence of the parts. When modifications are made to the parts or new parts are to be checked, only the workpiece attachment element, such as the clamps, locators, etc., need be specifically designed for the new or modified parts. The base, and in most cases, the risers may be utilized from previous fixtures thereby reducing the overall cost of the checking equipment.

The modular workpiece holding apparatus of the present invention also reduces setup time since only the risers and workpiece attachment tools need be replaced to check a new part. This eliminates the need to store one complete fixture and to bring a new fixture with its clamps and locators from storage and to precisely align the new fixture on a reference grid plate.

Storage requirements are also reduced since only the risers and attached workpiece attachment tools need be stored for each different part which is to be checked.

The workpiece holding apparatus of the present invention is extremely versatile in application. A single base may be utilized to check numerous parts at the same time, with one or more parts being located by appropriate risers and attachment elements on different faces of the base. The bases may also be stacked vertically or abutted side-by-side to check large parts or large assemblies containing multiple parts. This enables the fit between manufactured parts, such as the door and fender of a car, to be accurately and economically checked.

BRIEF DESCRIPTION OF THE DRAWING

The various features, advantages and other uses of the present invention will become more apparent by referring to the following detailed description and drawing in which:

FIG. 5 is a side elevational view of one type of bushing employed with each riser;

FIG. 6 is a bottom view of the bushing shown in FIG. 5;

FIG. 7 is a perspective view of another type of bushing employed with each riser;

FIG. 8 is a bottom view of the bushing shown in FIG. 7; and

FIG. 9 is a side elevational view of a fastener employed with the bushings shown in FIGS. 5 and 7.

DESCRIPTION OF THE PREFERRED EMBODIMENTS

Figure 1:
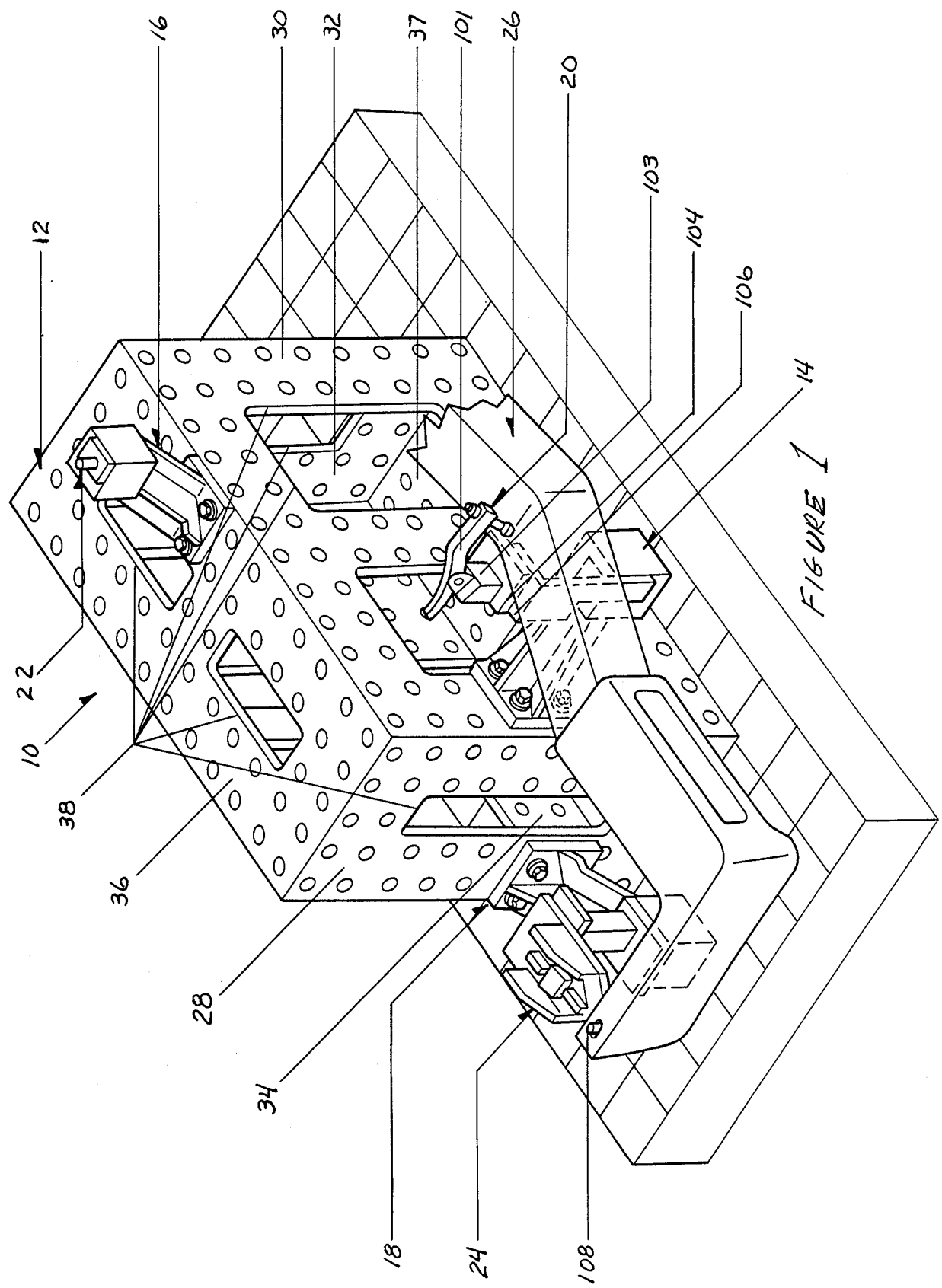
FIG. 1 is a perspective view of a modular workpiece holding apparatus constructed in accordance with the teachings of the present invention.

Throughout the following description and drawing, an identical reference number is used to refer to the same component shown in multiple figures of the drawing.

Referring now to the drawing, and to FIG. 1 in particular, there is illustrated a modular workpiece holding apparatus 10 which is used to locate and hold a workpiece in a precise location for checking the dimensions of the workpiece.

Throughout the following description, the terms "workpiece" or "part" are used to describe any type of manufactured part, including a single part or multiple parts joined together into a subassembly or assembly. Further, while the modular holding apparatus 10 of the present invention is described primarily for use in checking operations, it will be understood that it may also be used in machining operations to precisely hold and locate a workpiece during such operations.

The modular workpiece holding apparatus 10 of the present invention includes a base 12, a plurality of risers, such as risers 14, 16 and 18, and workpiece attachment means 20, 22 and 24, respectively connected to each riser 14, 16 and 18. It will be understood that the number of risers and workpiece attachment means illustrated in FIG. 1 is exemplary only as the number of such risers and workpiece attachment means will vary depending upon the size and nature of the workpiece 26.

The base 12 has a generally cubical configuration with either square or rectangular faces. The base 12 preferably includes a plurality of vertically extending faces and spaced, horizontally extending top and bottom faces. As shown in FIG. 1, the base 12 includes four vertically extending faces 28, 30, 32 and 34 and spaced, horizontally extending, top and bottom faces 36 and 37, respectively.

Each face 28, 30, 32, 34, 36 and 37 is planar in form. Apertures 38 are formed at selected locations in each face to provide ease of casting the base 12 as well as lifting the base 12 during use. The number and size of the apertures 38 are determined by the overall size of the base 12.

The base 12 is preferably cast as a single integral element which is then machined to a precision shape. The base 12 is hollow as shown in FIG. 1.

Figure 2:
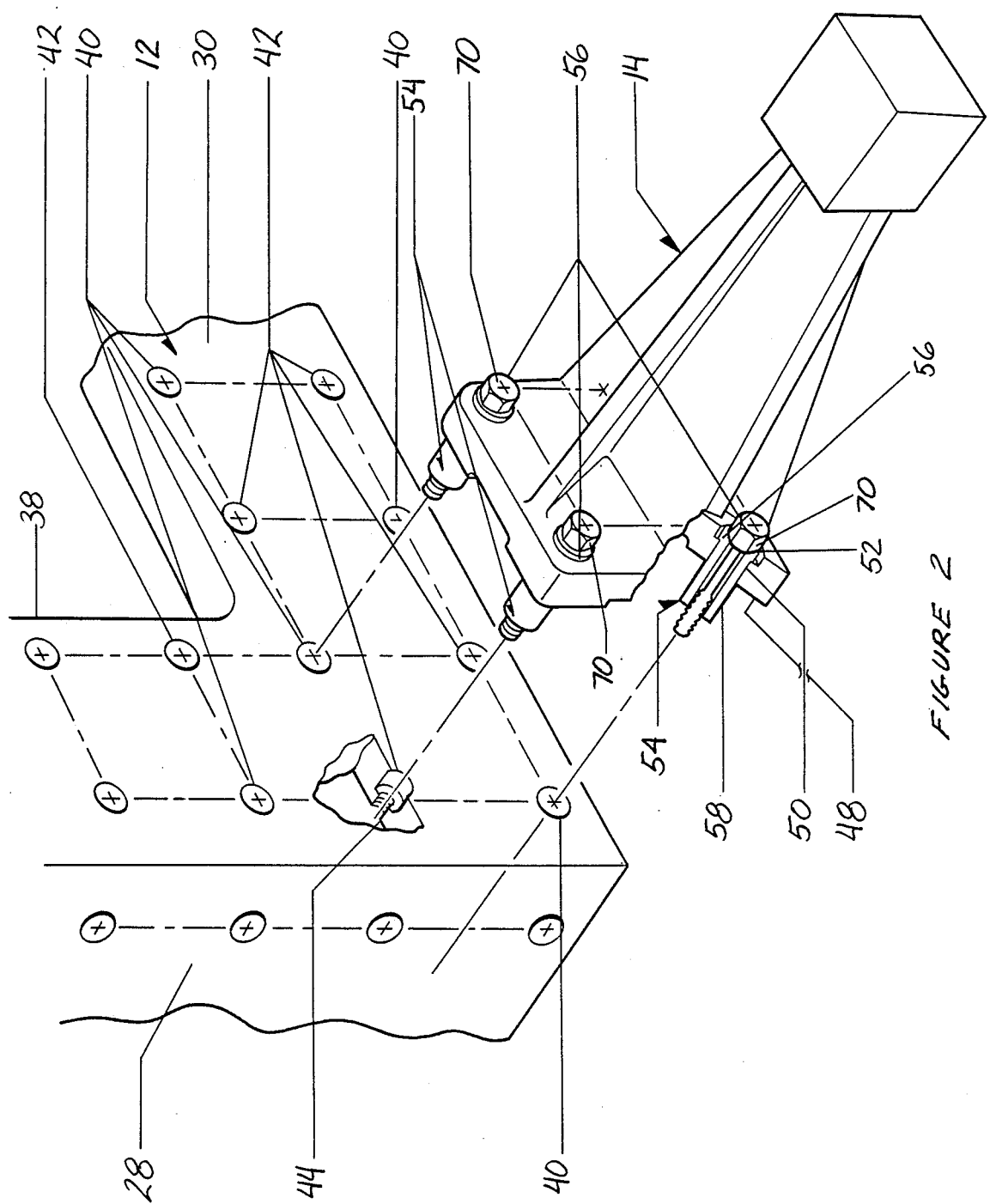
FIG. 2 is an exploded, partially broken away, enlarged perspective view of the modular workpiece holder apparatus illustrated in FIG. 1 showing the attachment of a riser to the base of the workpiece holder.

An X-Y grid arrangement of mounting bores are formed in each of the faces 28, 30, 32, 34, 36 and 37 in parallel horizontally and vertically extending rows. As shown in FIGS. 1 and 2, the bores in the base 12, such as on the face 30 of the base 12, alternate vertically and horizontally between a first diameter bore 40 used for precision mounting of the risers to the base 12 and a second, larger diameter bore 42. Thus, the bores 40 shown in FIG. 2 have a first diameter, such as $\frac{3}{4}''$; while the bores 42 have a second, larger diameter of approximately $\frac{7}{8}''$. These bore sizes are provided for example only and are not meant to limit the invention as any diameter bore may be employed. The bores 40 and 42 are provided at a predetermined spacing both vertically and horizontally, such as 100 mm square.

As shown in FIG. 2, each bore, such as bore 40, extends from the upper surface of one of the faces, such as face 30, a predetermined distance into the base 12. A smaller diameter, threaded bore 44 is co-axially aligned with each bore 40 and 42 and extends therefrom through each face, such as face 30, of the base 12.

Figure 3:
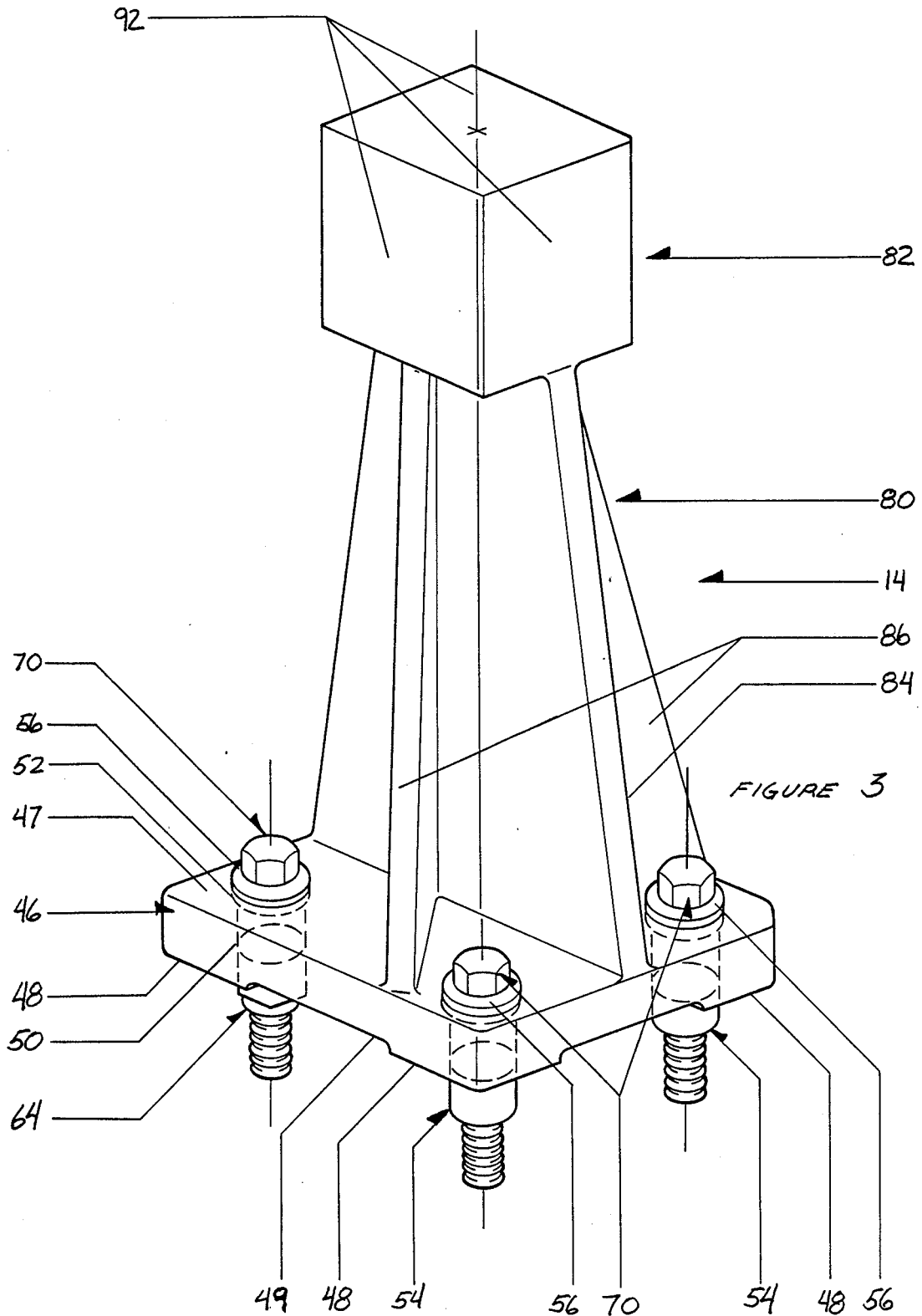
FIG. 3 is a perspective view of one embodiment of a riser employed in the present invention.
Figure 4:
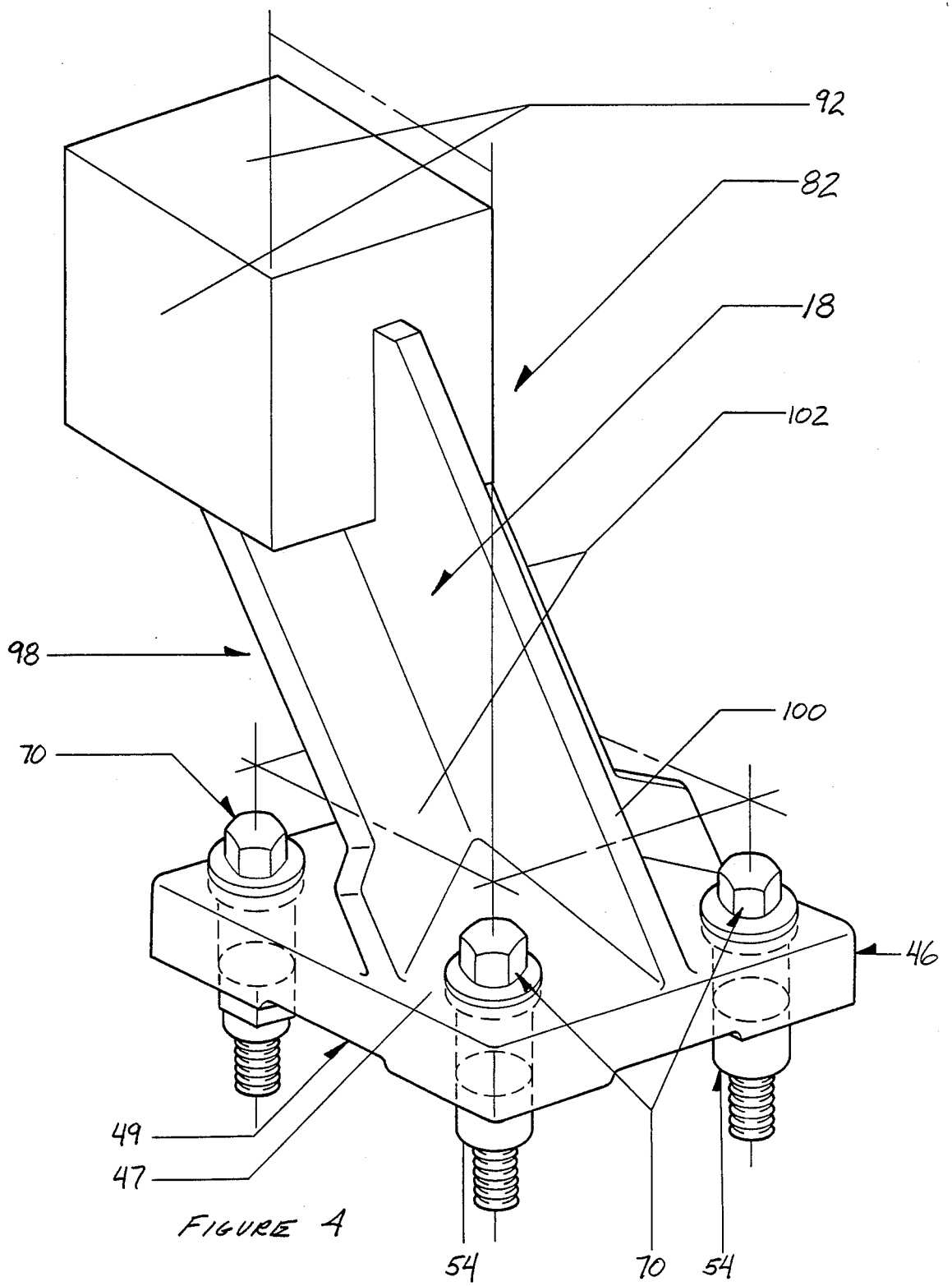
FIG. 4 is a perspective view of another embodiment of a riser.

As shown in FIGS. 2, 3 and 4, each of the risers is formed as a machined casting including a riser mounting base, a support and a mounting head. The riser 14 illustrated in FIG. 3 is provided to position a workpiece attachment tool, described hereafter, attached to the mounting head at a predetermined dimension and location with respect to the base 12. The riser 14 shown in FIG. 3 has an in-line or straight configuration in which the mounting head is substantially co-axially arranged with a vertical axis extending through the riser mounting base. Other configurations, as described hereafter, for certain risers may also be provided.

The riser 14 has a riser mounting base 46 with either a square, rectangular or other configuration. The base 46 has a planar top surface 47. A plurality of legs or pads 48 extend downward from the opposed surface 49 of the base 46 at each corner of the base 46.

A plurality of bores, such as four bores 50, are formed in the corners of the base 46 and extend through each leg 48 as shown in FIGS. 2 and 3. A shoulder 52 of enlarged diameter is formed at the upper end of each bore 50 and provides a seat for a bushing as described hereafter.

Means for attaching each riser to the base 12 is provided in the modular workpiece holding apparatus of the present invention. In a preferred embodiment, the attaching means comprises bushings and fasteners employed with each bore 50 in each riser mounting base 46. As shown in FIGS. 2 and 3 and in greater detail in FIGS. 5 and 6, each bushing 54 has a generally cylindrical shape and is formed of a hardened steel. Each bushing 54 is pressfit into a bore 50 in the base 46.

Each bushing 54 has a head 56 of enlarged diameter. The head 56 seats within the shoulder 52 in each bore 50. Each bushing 54 extends through the bore 50 with a lower end portion 58 extending outward from the bottom surface of each leg 48 of the riser mounting base 46.

A first diameter internal bore 60 is formed adjacent one end of each bushing 54, such as in the head 56 of the bushing 54. The first bore 60 is internally threaded as shown in FIG. 5. A second bore 62 of a diameter larger than the diameter of the first bore 60 extends axially through the entire length of the bushing 54 and is co-axial with the first bore 60. The second bore 62 is smooth and unthreaded.

In a preferred embodiment, the lower end portion 58 of the bushings 54 is provided with a smooth, substantially circular cross section, exterior surface as shown in FIG. 5. Other bushings 64, as shown in FIGS. 7 and 8 have a lower end portion 66 formed with a generally diamond-shaped surface formed of a plurality of angularly disposed faces 68.

In a preferred embodiment, two bushings 54 having a smooth, generally circular end portion 58 are mounted in two of the bores 50 in each riser mounting base 46, such as the bores 50 along one side of the riser mounting base 46 shown in FIG. 3. Two bushings 64, having a diamond-shaped end portion 66 are mounted in the opposite bores 50 in the riser mounting base 46. This forms two pairs of diagonally opposed bushings in each riser mounting base 46, with each pair formed of one bushing 54 having a generally smooth, circular end portion 58 and one bushing 64 having a diamond-shaped end portion 66. The purpose for these different bushing configurations will become more apparent hereafter.

Fastening means denoted by reference number 70 in FIGS. 2, 3 and 9 are employed to securely attach each riser, such as riser 14 to the base 12. The fastening means 70 preferably comprises a screw or bolt having a head 72 and an axial shaft 74. By way of example only, the head 72 may comprise a conventional hex bolthead or a socket head cap. The axial shaft 74 includes a first unthreaded, smooth portion 76 extending a predetermined distance from the head 72. The distal end 78 of the axial shaft 74 includes external threads 78 adapted to engage the threaded bore 44 associated with each bore 40 and 42 in the base 12.

In a preferred embodiment, the fastener 70 is self contained within each riser mounting base 46. This is achieved by the construction of the fastener 70 and the bores 60 and 62 in each bushing 54 and 64 as described above. As shown in FIG. 2, the fastener 70 is attached to the bushing 54 by first threading the threaded end portion 78 of the fastener 70 through the threads on the first bore 60 in the bushing 54. As the threaded end portion 78 of the fastener 70 passes through the threads in the first bore 60 in the bushing 54, the smooth, unthreaded portion 76 on the axial shaft of the fastener 70 will freely pass through the first bore 60 into the enlarged bore 62 within the bushing 54. In this position, as shown in FIG. 2, the threaded end portion 78 of the fastener 70 extends outward beyond the lower end portion 58 of the bushing 54. However, the fastener 70 is free to move axially within the bushing 54 until the riser mounting base 46 is attached to the base 12. An identical fastener 70 is used with and mounted in the bushings 64.

When the riser mounting base 46 is to be attached to the base 12, the bushings 54 and 64 extending outward from the base 46 are aligned with the desired bores 40 and 42 in the base 12, as shown in FIGS. 2 and 3. The lower end portions 58 and 66 of the bushings 54 and 64, respectively, are then inserted into the bores 40 and 42 in the base 12. When the bushings 54 and 64 are positioned within the respective bores 40 and 42, the fasteners 70 are tightened such that the threaded end portion 78 of each fastener 70 engages the internal threads in the bore 44 in the base 12 thereby securely attaching the riser to the base 12 at four points of attachment.

It should also be noted, as shown in FIG. 2, that regardless of the position or orientation of the riser mounting base 46, one diagonally opposed pair of bushings 54 and 64 are aligned with the first diameter bores 40 in the base 12. The other diagonally opposed pair of bushings 54 and 64 are disposed within the larger second diameter bores 42 thereby providing only fastening and not precise location of the riser with respect to the base 12.

The riser mounting base 46 may be rotated clockwise or counterclockwise about a vertical axis through the mounting base 46. Regardless of the position of the mounting base 46, one diagonally opposed pair of bushings 54 and 64 will be aligned with the first diameter bores 40 thereby providing precise location of the riser with respect to the base 12.

As described generally above, each riser, such as riser 14 shown in FIG. 3, includes a support 80 and a workpiece mounting head 82. The support 80 may be of any desired length, such as 200 mm. or 300 mm. In the embodiment shown in FIG. 3, the support 80 is configured to dispose the mounting head 82 substantially in line with a vertical axis extending through the riser mounting base 46. In this embodiment, the riser support 80 is formed of a plurality of intersecting planar ribs. In a preferred embodiment, illustrated by way of example only, the support 80 includes a first planar rib 84 having a generally triangular shape. The base of the rib 84 extends across the entire width of the mounting base 46 of the riser 14, with the sides of the rib 84 tapering inward to one end at which they are connected to the mounting head 82. A pair of triangularly shaped ribs 86 are also mounted on the riser base 46 and extend from the riser base 46 to the mounting head 82. The ribs 86 are disposed at an angle with respect to the first rib 84 and provide lateral support for the rib 84.

The mounting head 82 is preferably a generally cubical, solid body, with generally square or rectangular faces 92. In a preferred embodiment, as many as five mounting faces 92 are provided on each mounting head 82 to enable a workpiece attachment means, described hereafter, to be mounted to the mounting head 82 in any orientation. Suitable mounting bores will be formed in each face 92 at desired locations to mount a particular workpiece attachment means to the mounting head 82.

A different type of riser support 98 is depicted in FIG. 4 on the riser 18. In this type of riser, the support 98 is configured so as to dispose the mounting head 82 offset from a vertical axis extending centrally through the riser mounting base 46. The support 98 is formed of a plurality of generally planar ribs which are disposed at an angle with respect to the top surface 47 of the riser base 46. In a preferred embodiment, the ribs include a first main rib 100 which extends completely across the riser mounting base 46. The side edges of the rib 100 are disposed at an angle with respect to the top surface 47 of the base 46 as shown in FIG. 4. A pair of angularly disposed support ribs 102 are also formed on the riser mounting base 46 and extend from the riser mounting base upper surface 47 to the mounting head 82. The ribs 102 provide lateral support for the first rib 100.

Each workpiece attachment means, such as workpiece attachment means 20, 22 and 24, shown in FIG. 1, is designed to locate and hold a specific workpiece 26 on the base 12. As shown in detail in FIG. 1, the workpiece attachment means, such as workpiece attachment means 20, is designed to securely mount a workpiece 26, such as a vehicle front facia, to the base 12. The workpiece attachment means 20 is mounted by suitable fasteners to the mounting head 82 of the riser 14. It will be understood that any type of workpiece attachment means may be employed as dictated by the requirements of a specific application. By way of example only, the workpiece attachment means 20 comprises a conventional pivotal clamp 101 which is mounted via suitable brackets 103 and 104 to a mounting base 106. The mounting base 106 is secured to one face 92 of the mounting head 82 by suitable fasteners which extend through the base 106 into mounting holes, not shown, formed in the mounting head 82.

A locating pin is mounted directly on the mounting head of attachment means 22, as shown in FIG. 1. The locating pin, as is conventional, is adapted to extend through an aperture formed in a workpiece to locate the workpiece with respect to a particular coordinate established on the base 12. The clamp 101 holds the workpiece 26 in a fixed position with respect to the base 12.

As also shown in FIG. 1, a workpiece attachment means 24 is mounted on a side face of the mounting head 82 on the riser 18. This workpiece attachment means 24 carries a locating pin 108 which is secured by suitable brackets to a side face 92 of the mounting head 82 on the riser 18. This clearly identifies the multiple use of the mounting head 82 on each riser to enable a part having any particular size or shape to be easily and securely mounted on the base 12 at a precisely established coordinate position.

In use, the modular workpiece holding apparatus 10 of the present invention may be used in a variety of different applications to hold and locate single workpieces, multiple workpieces or entire assemblies for dimensional checking. As shown in FIG. 1, multiple faces of the base 12 are employed to locate and hold a single workpiece 26. Depending on the part size and configuration, the risers and workpiece attachment means may be mounted on a single face of the base 12, or on multiple faces as shown in FIG. 1. Alternately, specific risers and workpiece attachment means may be mounted on one face of the base 12 for holding a single part and other faces of the base 12 employed with other risers and workpiece attachment means to locate and hold different parts on the base 12 thereby adding additional versatility to the use of the modular workpiece holding apparatus 10 of the present invention.

Further, a plurality of bases 12 may be stacked vertically or arranged side-by-side to enable large parts or workpieces or entire assemblies or subassemblies to be held and located for dimensional checking. This would also enable multiple assemblies to be held together in their final assembled condition to check fits, clearances, etc. Also, the base 12 may be mounted on a rotary table to provide access to each of the faces as necessary for dimensional checking applications.

Although not shown, further expeditious use of the modular workpiece holding apparatus 10 of the present invention may be achieved by utilizing a template having the size of one of the faces, such as face 30 of the base 12. Apertures corresponding to the shape of a riser base 46 are formed in the template at locations corresponding to a specific mounting position of the mount base 46 of one or more risers on a particular face of the base 12. Complimentary notches formed along one corner of a riser base 46 and in one aperture in the template may be used to precisely orient each riser on the base and to simplify the attachment of the riser to the base in a specific orientation. By use of the template, the risers and attached workpiece attachment means may be securely attached to the base 12 in a specific application for mounting a particular part on the base 12. When other parts are to be checked, the risers and workpiece attachment means associated with such parts may be mounted on the base 12 on any face or faces thereof by means of templates associated with each part.

In summary, there has been disclosed a unique modular workpiece holding apparatus which simplifies the dimensional checking of manufactured workpieces or parts. By providing a base which receives modular risers and workpiece attachment means, the base may be employed to hold and locate many different parts, with only the risers and workpiece attachment means being specifically designed and employed for each part. This reduces the storage requirements of discrete, separate fixtures for each part to be checked as well as significantly reducing setup time for each checking operation. In addition, as the parts change from year to year or become obsolete, the base and the risers may be reused for other parts with only the workpiece attachment means, and in some cases, the risers being changed as necessary for a particular part.

What is claimed is:
1. A modular workpiece holding apparatus for positioning and holding a workpiece comprising:
   a base having a plurality of exterior faces;
   a plurality of bores formed in each face of the base in parallel rows forming an X-Y grid pattern, the bores alternating vertically and horizontally between a first diameter bore and a second different diameter bore, each bore having a threaded end portion;
   a riser having a riser mounting base, a support of a predetermined length connected at one end to and extending away from the riser mounting base and a mounting head connected to a second end of the support;
   workpiece engaging means, connected to the riser mounting head, for engaging and locating a workpiece;
   a plurality of bores extending through the riser mounting base;
   a bushing fixedly mounted in each bore of the riser mounting base and extending outward from one surface of the riser mounting base;
   fastening means, extending through each bushing in the riser mounting base and engaging the threaded end portion of a bore in the base, for securing the riser to the base; and
   the bores in the riser mounting base being spacedly arranged to align with selected bores in one face of the base, with certain bushings in the riser mounting base engaging the first diameter bores in the base and the certain other bushings in the riser mounting base engaging the second diameter bores in the base.

2. The modular workpiece holding apparatus of claim 1 wherein the fastening means comprises:
   a screw having a head and an axial shaft;
   an unthreaded portion formed on the axial shaft extending from the head; and
   a plurality of external threads formed on the axial shaft extending from the unthreaded portion of the shaft to one end of the shaft.

3. The modular workpiece holding apparatus of claim 1 wherein each bushing comprises:
   a cylindrical body having a first bore formed adjacent one end;
   a plurality of internal threads formed in the first bore; and
   a second, unthreaded, enlarged diameter bore coaxially aligned with and extending from the first bore through the bushing.

4. The modular workpiece holding apparatus of claim 1 wherein:
   four bores are formed in each riser mounting base in diagonally opposed pairs.

5. The modular workpiece holding apparatus of claim 4 wherein:
   one bushing in each diagonally opposed pair of bores in the riser mounting base has a circular exterior end portion; and
   the other bushing in each diagonally opposed pair of bores has a polygonal shaped exterior end surface.

6. The modular workpiece holding apparatus of claim 1 wherein:
   the mounting head is positioned axially in line with a vertical axis through the center of a riser mounting base.

7. The modular workpiece holding apparatus of claim 1 wherein:
   the mounting head is offset from a vertical axis extending through the center of a riser mounting base.

8. The modular workpiece holding apparatus of claim 1 wherein:
   the base has a plurality of vertically extending faces and one, horizontally extending, top face.

9. A modular workpiece holding apparatus for positioning and holding a workpiece comprising:
   a base having a plurality of vertically extending exterior faces and one, horizontally extending, top exterior face;
   a plurality of bores formed in each face of the base in parallel rows forming an X-Y grid pattern, the bores alternating vertically and horizontally in each face between a first diameter bore and a second, larger diameter bore, each bore having a threaded end portion;
   a plurality of risers, each riser having a riser mounting base, a support of a predetermined length connected at one end and extending away from the riser mounting base, and a mounting head connected to a second end of the support;
   four bores formed in and extending through each riser mounting base, the bores arranged in diagonally opposed pairs;
   a bushing fixedly mounted in each bore of the riser mounting base and extending outward from one surface of the riser mounting base;

each bushing having a first bore formed adjacent one end with a plurality of internal threads formed thereon, and a second unthreaded, enlarged bore coaxially extending from the first bore through the bushing;

a fastener associated with each bushing and having a head and an axial shaft, the axial shaft having a smooth, unthreaded exterior extending a predetermined distance from the head and an externally threaded end portion, the externally threaded end portion of the fastener threadingly extendible through the threaded first bore in each bushing to dispose the axial shaft of the fastener within the enlarged second diameter bore of each bushing; and workpiece engaging means, connected to the riser mounting head, for engaging and locating a workpiece.

10. The modular workpiece holding apparatus of claim 1 wherein:

each bushing comprises:
a cylindrical body having a first threaded bore formed adjacent one end; and
a second, unthreaded, enlarged diameter bore coaxially aligned with and extending from the first bore through the bushing; and each fastening means comprises:
a screw having a head and an axial shaft;
an unthreaded portion formed on the axial shaft extending from the head; and
a plurality of external threads formed on the axial shaft extending from the unthreaded portion of the shaft to one end of the shaft, and wherein
the threaded portion of the axial shaft is threadingly extendible through the first threaded bore in the body of the bushing to captively and movably dispose the unthreaded portion of the axial shaft of the fastener within the second enlarged diameter bore in the bushing.

11. The modular workpiece holding apparatus of claim 5 wherein:

the polygonal shaped exterior end surface of the other bushing in each diagonally opposed pair of bores is a diamond shape.

12. A modular workpiece holding apparatus for positioning and holding a workpiece by a workpiece holding means comprising:

a base having a plurality of exterior faces;
a plurality of bores formed in each face of the base in parallel rows forming a X-Y grid pattern, the bores alternating vertically and horizontally between a first diameter bore and a second larger diameter bore, each bore having a threaded end portion;
a riser having a riser mounting base, a support of a predetermined length connected at one end to and extending away from the riser mounting base and a mounting head connected to a second end of the support for fixedly receiving a workpiece engaging means for engaging and locating a workpiece;
a plurality of bores extending through the riser mounting base;
a bushing fixedly mounted in each bore of the riser mounting base and extending outward from one surface of the riser mounting base;
fastening means, extending through each bushing in the riser mounting base and engaging the threaded end portion of a bore in the base, for securing the riser to the base; and the bores in the riser mounting base being spacedly arranged to align with selected bores in one face of the base, with certain bushings in the riser mounting base engaging the first diameter bores in the base and the certain other bushings in the riser mounting base engaging the second diameter bores in the base.

13. A modular workpiece holding apparatus for positioning and holding a workpiece by a workpiece holding means comprising:

a base having an exterior face;
a plurality of bores formed in the face in parallel rows forming an X-Y grid pattern, the bores alternating vertically and horizontally between a first diameter bore and a second larger diameter bore, each bore having a threaded end portion;
a riser having a riser mounting base, a support of a predetermined length connected at one end to and extending away from the riser mounting base and a mounting head connected to a second end of the support for fixedly receiving a workpiece engaging means for engaging and locating a workpiece;
a plurality of bores extending through the riser mounting base;
a bushing fixedly mounted in each bore of the riser mounting base and extending outward from one surface of the riser mounting base;
fastening means, extending through each bushing in the riser mounting base and engaging the threaded end portion of a bore in the base, for securing the riser to the base; and
the bores in the riser mounting base being spacedly arranged to align with selected bores in one face of the base, with certain bushings in the riser mounting base engaging the first diameter bores in the base and the certain other bushings in the riser mounting base engaging the second diameter bores in the base.

14. The modular workpiece holding apparatus of claim 13 wherein the fastening means comprises:

a screw having a head and an axial shaft;
an unthreaded portion formed on the axial shaft extending from the head; and
a plurality of external threads formed on the axial shaft extending from the unthreaded portion of the shaft to one end of the shaft.

15. The modular workpiece holding apparatus of claim 13 wherein each bushing comprises:

a cylindrical body having a first bore formed adjacent one end;
a plurality of internal threads formed in the first bore; and
a second, unthreaded, enlarged diameter bore coaxially aligned with and extending from the first bore through the bushing.

16. The modular workpiece holding apparatus of claim 13 wherein:

four bores are formed in each riser mounting base in diagonally opposed pairs.

17. The modular workpiece holding apparatus of claim 16 wherein:

one bushing in each diagonally opposed pair of bores in the riser mounting base has a circular exterior end portion; and
the other bushing in each diagonally opposed pair of bores has a polygonal shaped exterior end surface.

18. The modular workpiece holding apparatus of claim 17 wherein:

the polygonal shaped exterior end surface of the other bushing in each diagonally opposed pair of bores is a diamond shape.

19. The modular workpiece holding apparatus of claim 13 wherein:
the mounting head is positioned axially in line with a vertical axis through the center of a riser mounting base.

20. The modular workpiece holding apparatus of claim 13 wherein:
the mounting head is offset from a vertical axis extending through the center of a riser mounting base.

21. The modular workpiece holding apparatus of claim 13 wherein:
the base has a plurality of vertically extending faces and one, horizontally extending, top face.

22. The modular workpiece holding apparatus of claim 13 wherein:
each bushing comprises:
a cylindrical body having a first threaded bore formed adjacent one end; and
a second, unthreaded, enlarged diameter bore coaxially aligned with and extending from the first bore through the bushing; and
each fastening means comprises:
a screw having a head and an axial shaft;
an unthreaded portion formed on the axial shaft extending from the head; and
a plurality of external threads formed on the axial shaft extending from the unthreaded portion of the shaft to one end of the shaft, and wherein
the threaded portion of the axial shaft is threadingly extendible through the first threaded bore in the body of the bushing to captively and movably dispose the unthreaded portion of the axial shaft of the fastener within the second enlarged diameter bore in the bushing.

23. A modular workpiece holding apparatus for positioning and holding a workpiece by a workpiece holding means comprising:
a base having an exterior face;
a plurality of bores formed in the face in parallel rows forming an X-Y grid pattern, the bores alternating vertically and horizontally in the face between a first diameter bore and a second, larger diameter bore, each bore having a threaded end portion;
a plurality of risers, each riser having a riser mounting base, a support of a predetermined length connected at one end and extending away from the riser mounting base, and a mounting head connected to a second end of the support for fixedly receiving a workpiece holding means;
four bores formed in and extending through each riser mounting base, the bores arranged in diagonally opposed pairs;
a bushing fixedly mounted in each bore of the riser mounting base and extending outward from one surface of the riser mounting base;
each bushing having a first bore formed adjacent one end with a plurality of internal threads formed thereon, and a second unthreaded, enlarged bore coaxially extending from the first bore through the bushing; and
a fastener associated with each bushing and having a head and an axial shaft, the axial shaft having a smooth, unthreaded exterior extending a predetermined distance from the head and an externally threaded end portion, the externally threaded end portion of the fastener threadingly extendible through the threaded first bore in each bushing to dispose the axial shaft of the fastener within the enlarged second diameter bore of each bushing.

* * * * *